United States Patent [19]

Morikawa et al.

[11] Patent Number: 4,965,771
[45] Date of Patent: Oct. 23, 1990

[54] PRINTER CONTROLLER FOR CONNECTING A PRINTER TO AN INFORMATION PROCESSOR HAVING A DIFFERENT PROTOCOL FROM THAT OF A PRINTER

[75] Inventors: Takashi Morikawa, Toyokawa, Japan; Yoshikazu Ikenoue, Fort Lee, N.J.

[73] Assignee: Minolta Camera Kabushiki Kaisha, Osaka, Japan

[21] Appl. No.: 85,409

[22] Filed: Aug. 14, 1987

[30] Foreign Application Priority Data

Aug. 18, 1986 [JP] Japan ................................. 61-191683
Aug. 18, 1986 [JP] Japan ................................. 61-191684

[51] Int. Cl.⁵ ............................................... G06F 3/12
[52] U.S. Cl. .............................. 364/900; 364/926.9; 364/930; 364/940; 364/940.81
[58] Field of Search ... 364/200 MS File, 900 MS File

[56] References Cited

U.S. PATENT DOCUMENTS

| | | | |
|---|---|---|---|
| 4,282,583 | 8/1981 | Khan et al. | 364/900 |
| 4,353,653 | 10/1982 | Zimmerman | 364/900 |
| 4,426,166 | 1/1984 | Bowling | 400/144 |
| 4,452,136 | 6/1984 | Boynton et al. | 364/900 |
| 4,651,278 | 3/1987 | Herzog et al. | 364/900 |
| 4,710,886 | 12/1987 | Heath | 364/519 |
| 4,742,483 | 5/1988 | Morrell | 364/900 |
| 4,754,428 | 6/1988 | Schultz et al. | 364/900 |

FOREIGN PATENT DOCUMENTS

| | | |
|---|---|---|
| 3506592 | 2/1985 | Fed. Rep. of Germany . |
| 2060318A | 4/1981 | United Kingdom . |
| 2156558 | 2/1985 | United Kingdom . |

OTHER PUBLICATIONS

D. O. Hays, et al., "Standard Printer or I/O Adapter Control Method and Apparatus," IBM Technical Disclosure Bulletin, vol. 22, No. 1, Jun. 1979.
Rafiquzzaman, "Microprocessors and Microcomputer Development Systems," pp. 99–100.

Primary Examiner—Raulfe B. Zache
Attorney, Agent, or Firm—Burns, Doane, Swecker & Mathis

[57] ABSTRACT

A printer controller is provided for operatively connecting a printer to any one of a plurality of information processing equipments each having a protocol different from that of the printer. The printer controller includes a microprocessor which reads printer control informations provided by each information processing equipment, based on the specific protocol of the information processing equipment, converts the control informations into printer functional parameters corresponding to printer control commands specified by the control informations, and controls the printer directly in accordance with the printer functional parameters.

4 Claims, 20 Drawing Sheets

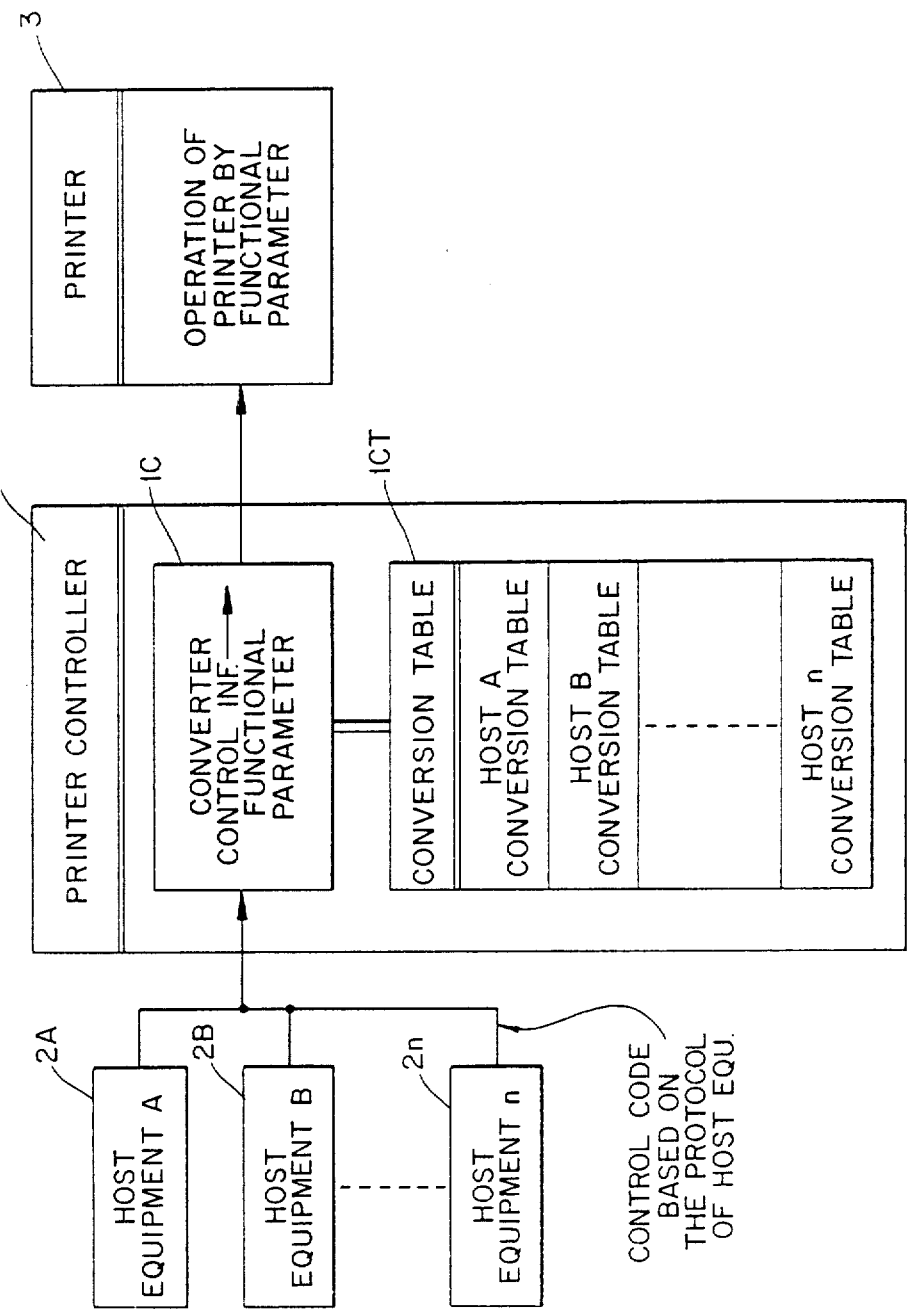

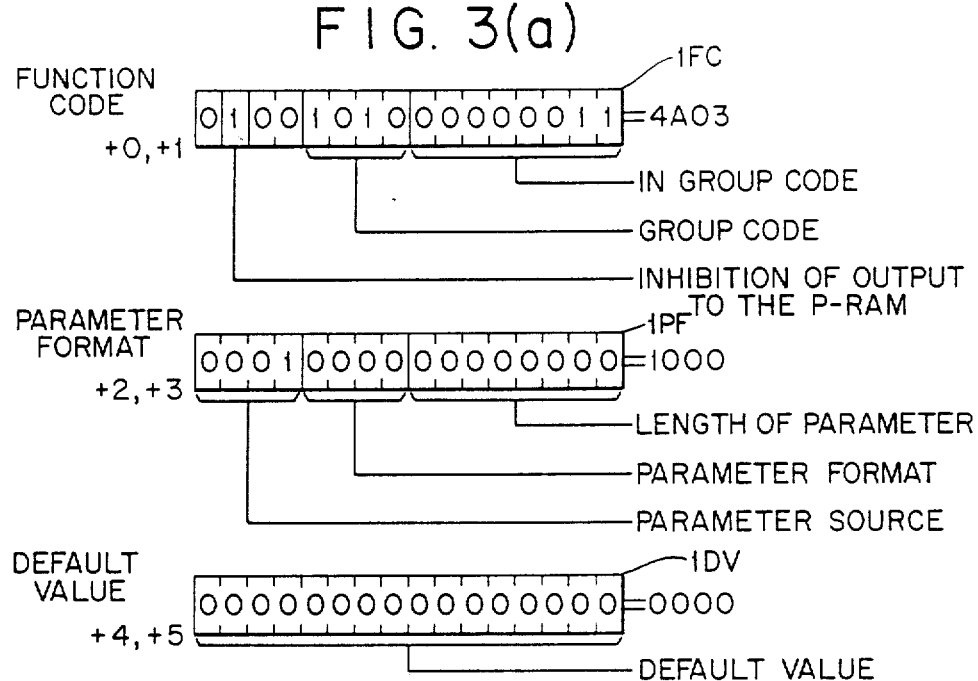
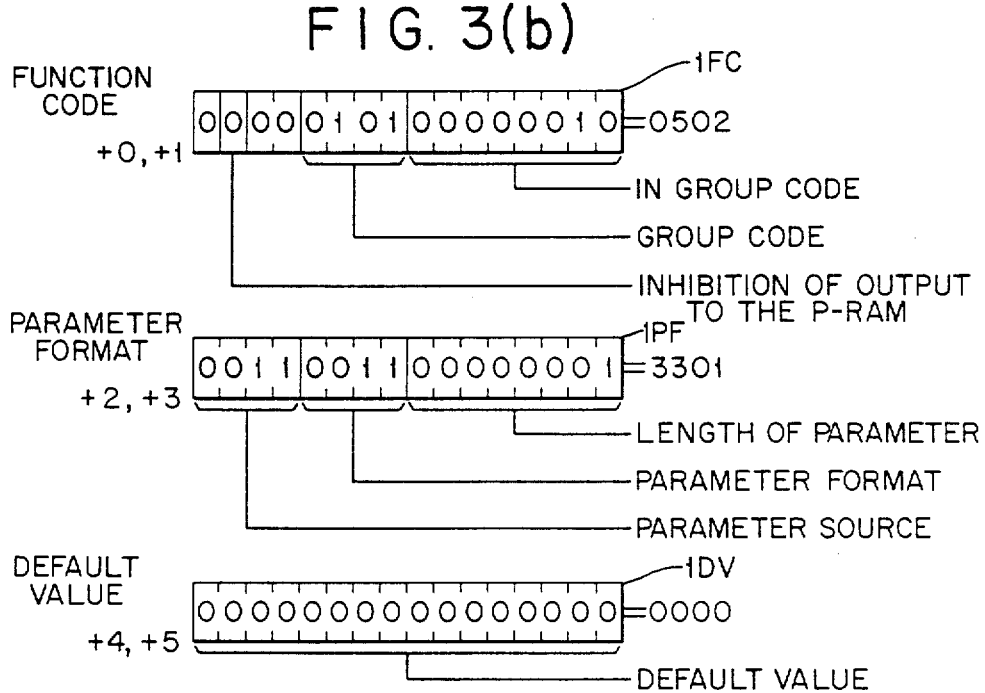

FIG. 4

| GROUP CODE | NAME OF GROUP | FUNCTION |
|---|---|---|
| 1 | C-CURSOR | CONTROL OF CHARACTER & CURSOR |
| 2 | JOB | IMAGE SEQUENCE OF CHARACTER GEN. |
| 3 | PROTOCOL | CONTROL OF PROTOCOL |
| 4 | FONT | CONTROL OF FONT CARTRIDGE |
| 5 | ENGINE | MODE CHANGE OF PRINTER |
| 6 | GRAPHIC | CONTROL OF GRAPHICS |
| 7 | OPTION | OPTION MODE OF PRINTER |
| 8 | HOST (COMM) | CONTROL OF HOST EQUIPMENT |
| 9 | | |
| A | REPORT | REPORT MODE TO HOST EQUIPMENT |
| B | | |
| C | | |
| D | | |

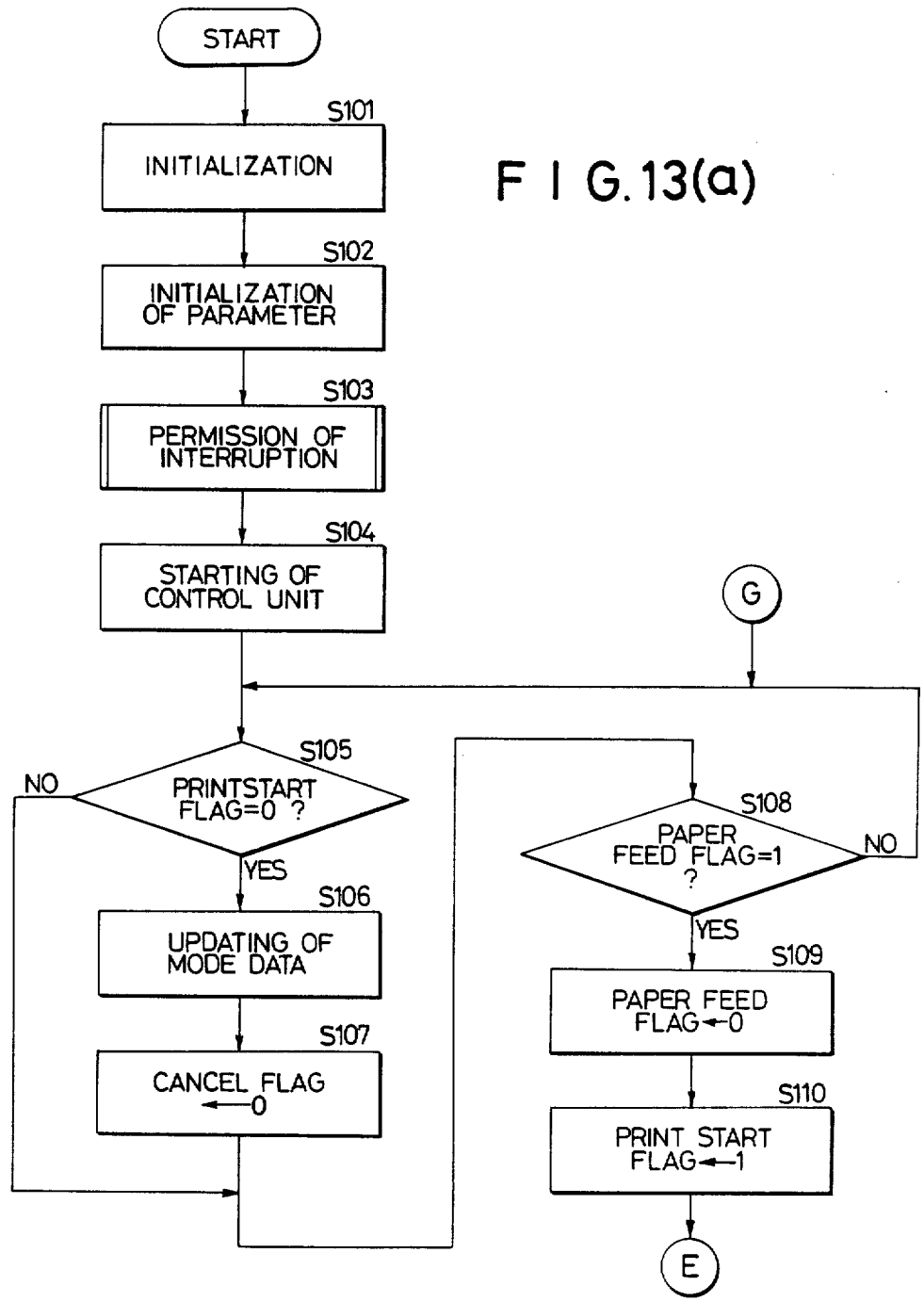

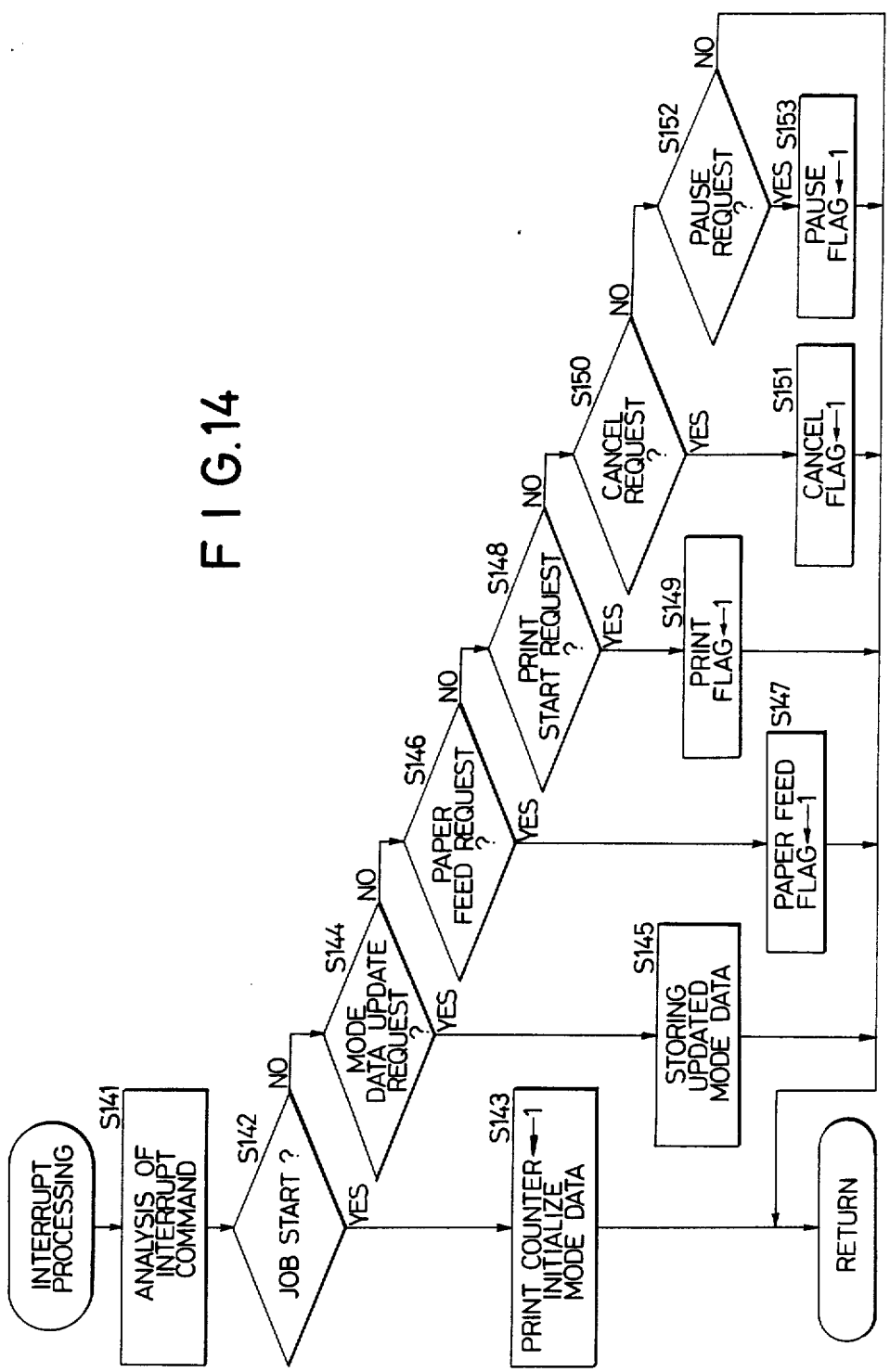
F I G. 14

PRINTER CONTROLLER FOR CONNECTING A PRINTER TO AN INFORMATION PROCESSOR HAVING A DIFFERENT PROTOCOL FROM THAT OF A PRINTER

BACKGROUND OF THE INVENTION

1. Field of the Invention

The present invention relates to a printer controller capable of connecting a printer to a plurality of information processing devices having different protocols.

2. Description of the Prior Art:

In an information processing system such as a computer, control information and recording information are transmitted between an output equipment such as a printer, and a host equipment, such as an information processing equipment. Information must be transmitted between the host equipment and the output equipment in accordance with a predetermined protocol which can be decoded by both the host equipment and the output equipment, otherwise the information processing system is unable to function. Accordingly, the protocol of the output equipment, for example, a printer, is prescribed in conformity with the protocol of the host equipment. Therefore, a printer is designed specially for use with a host equipment, or a printer must be equipped with a special protocol converter to be used with a host equipment, when the printer has its original protocol.

In an ordinary protocol converter, a protocol conversion program is operated by the control processor of the printer to convert the control information provided by the host eqiupment into control information represented by the standard protocol of the printer. The converted control information is processed further in the printer to be decoded and converted into internal parameters for controlling the printer.

However, when such a conventional protocol conversion means is employed, the number of protocol conversion programs to be prepared for a printer must correspond to the number of types of host eqiupments to enable the printer to be connected to a plurality of types of host equipments. Accordingly, the number of program steps of the protocol conversion programs increases enormously as the number of types of host equipments to which the printer can be connected increases, whereas only a part of the protocol conversion programs is used in the practical operation of the protocol converter because the printer is connected only to a specified host equipment, which is inefficient in respect of the development of protocol conversion programs and the provision of the protocol conversion programs.

Another possible means is to store protocol conversion programs corresponding to the types of host equipments to which the printer can be connected in read only memories (ROMs) and to mount a ROM storing a specific protocol conversion program for a specific host equipment on the protocol converter when the printer is assigned to the specific host equipment. However, this means requires the same efforts for developing the protocol conversion programs as the foregoing means and requires labor and expenses for producing ROMs for storing the protocol control programs. Thus, it has been inefficient to enable a single output equipment such as a printer to be connected to a plurality of types of host equipments.

SUMMARY OF THE INVENTION

Accordingly, it is a principal object of the present invention to provide a printer controller capable of connecting a printer to a plurality of information processing equipments respectively having different protocols.

It is another object of the present invention to provide a printer controller capable of operating a printer by directly converting specific printer control data based on the specific protocols of information processing equipments into printer control commands being used for operating elements of a printer connected to the information processing equipments.

The above and other objects and features of the present invention will appear more fully hereinafter from a consideration of the following description taken in conjunction with the accompanying drawings illustrating one embodiment of the present invention by way of example.

BRIEF DESCRIPTION OF THE DRAWINGS

FIG. 1(a) is a block diagram explaining the general idea of a protocol converting method according to the present invention;

FIGS. 3(a) and 3(b) are diagrammatic illustrations of an embodiment of a protocol conversion table;

FIG. 4 is a table explaining examples of group codes;

FIGS. 13a, 13b, 13c and 14 are flow charts of data processing procedures to be executed by the printer interface control unit of the printer controller of FIG. 5.

DESCRIPTION OF THE PREFERRED EMBODIMENT

The general idea of a protocol converting method in accordance with the present invention will be described prior to the detailed description of a printer controller embodying the present invention in comparison with a conventional method.

Figure 1B:
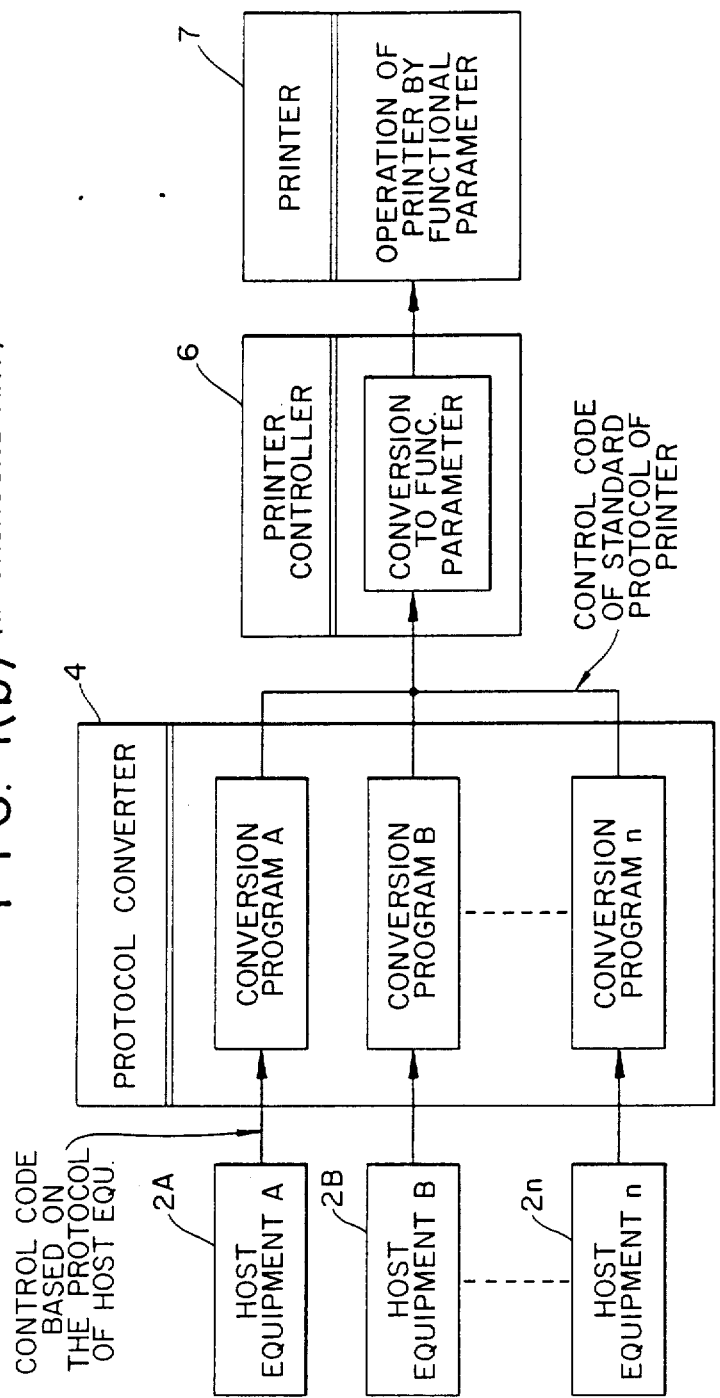
FIG. 1(b) is a block diagram of assistance in explaining the general idea of a conventional protocol converting method.

Referring to FIG. 1(b) showing the general idea of a protocol converting method to be executed by a conventional printer controller 1, a protocol converter 4 has protocol conversion programs A, B, ... and n corresponding to the protocols of n types of host equipments 2A, 2B, ... and 2n to deal with information from the host equipments 2A, 2B, ... and 2n. The protocol conversion programs are operated selectively according to the host equipment to which a printer 7 is connected. Control information based on the protocol of the host equipments is converted into control codes conforming to the standard protocol of the printer 7 by the protocol converter 4. Then, a printer controller 6 converts the control codes further into functional parameters of the printer 7.

Referring to FIG. 1(a) showing the general idea of a protocol converting method to be executed by a printer controller 1 embodying the present invention, control information based on the protocols of host equipments is converted directly into functional parameters of the printer 3.

The printer controller 1 embodying the present invention has protocol converting means 1C for converting control information provided by information processing equipments into functional information for the printer 3 corresponding to functions specified by the control information, comprising conversion tables 1CT for converting control information provided by the information processing equipments into functional parameters for controlling the operation of the printer 3, and a program to be carried out by a microprocessor on the basis of the conversion tables 1CT to convert the control information into functional parameters. The n kinds of conversion tables 1CT correspond to information processing equipments, namely, n types of host equipments 2A, 2B, ... 2n to which the printer 3 is to be connected. The conversion tables 1CT are selected by selecting means such as a dip switch.

Figure 2A:
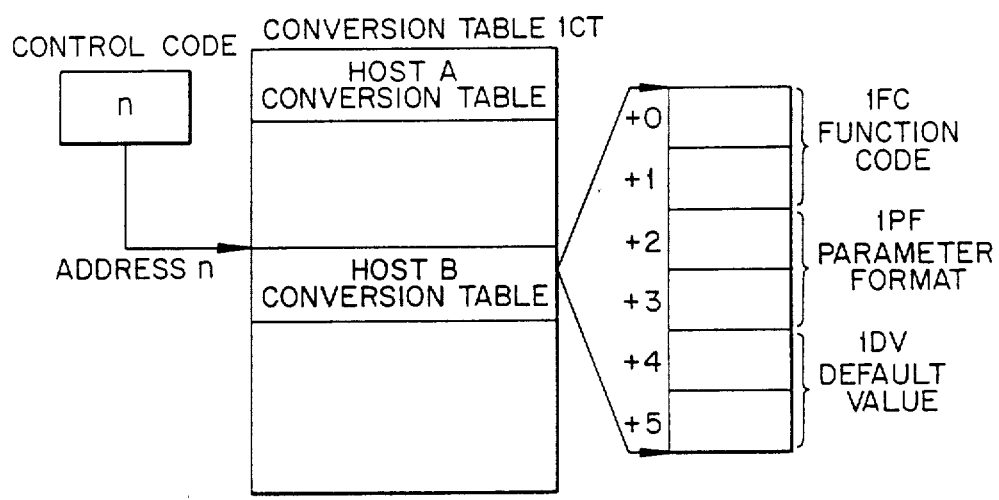
FIGS. 2(a) and 2(b) are diagrammatic illustrations explaining a protocol conversion table.
Figure 2B:
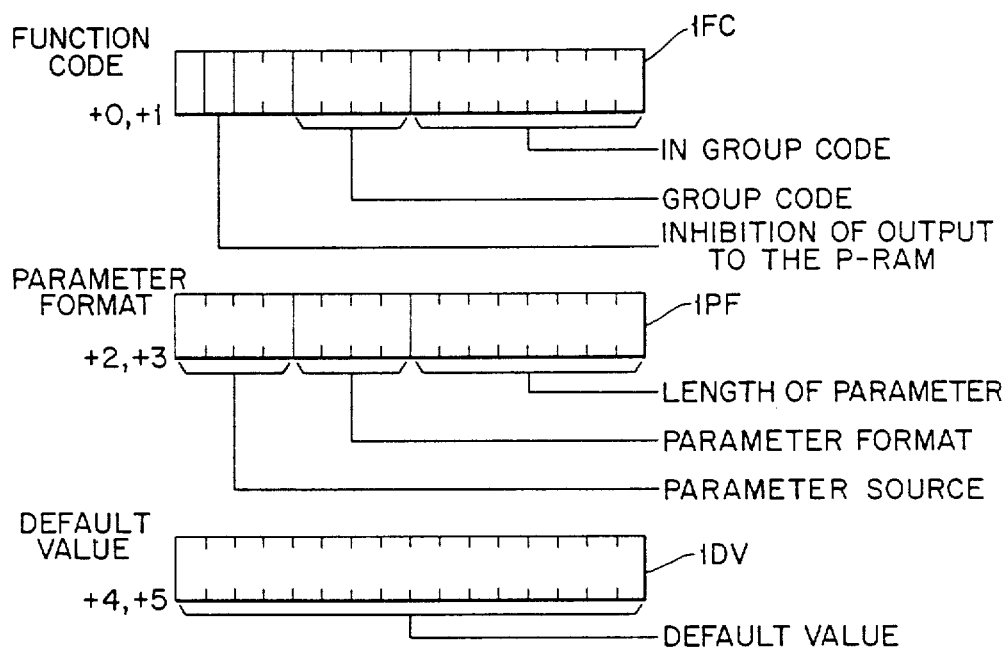

Examples of such conversion tables are shown in FIGS. 2(a) and 2(b). The conversion tables are incorporated into a printer functional parameter conversion program and are stored in a ROM. The initial address for storing each conversion table 1CT is decided for the corresponding host equipment. For example, the initial address for the conversion table for the host equipment 2A is an address 1000, and the initial address for the conversion table for the host equipment B is an address 2000.

Referring to FIGS. 2(a) and 2(b), each conversion table has six bytes; two bytes for function codes 1CT, two bytes for parameter formats 1PF, and two bytes for default values 1DV.

Each function code designates a printer function. The function code consists of one bit for indicating the inhibition of output to the printer RAM, four bits for group code, and eight bits for in-group code. The rest of the bits are unused. As shown in FIG. 4, the group codes identify functions of the printer. The in-group code prescribes the details of a function designated by a group code.

Parameter format is information relating to parameter describing format, consisting of four bits for parameter source, four bits for parameter format, and eight bits for parameter length. The parameter source indicates the source of a parameter and indicates, for example, whether a parameter is given from the host equipment or a parameter is decided unilaterally within the printer. The four bits for the parameter format indicates the numeric representation of parameters, namely, whether the parameter is a decimal numeral or a hexadecimal number, or a character code. The parameter length indicates the number of digits of a parameter in a byte value.

The default value are the contents of the parameters indicated by numerical values. Parameters of fixed values are designated by the parameter source by designating default value tables.

FIGS. 3(a) and 3(b) show examples of the contents of the conversion tables. FIG. 3(a) shows contents designating reporting to the host equipment, in which, in a function code "4A03", "4" indicates the inhibition of output to the P-RAM (a temporary memory unit for storing intermediate codes of a character code and a control code), "A" indicates a group code A shown in FIG. 4, and "03" indicates an in-group code 03 designating a decimal mode; in a parameter format "1000", a parameter source "1" indicates that there is no parameter, a parameter format is "0", and a parameter length "00" indicating that there is no parameter; a default value "0000" indicates that no default value is designated.

Similarly, FIG. 3(b) shows a function code "0502", a parameter format "3301", and a default value "0000"; the change of paper size is designated, the contents of the P-RAM are allowed to output and a group code "5" indicates the change the mode of the engine, namely, the printer. A parameter source "3" indicates the external input of a parameter, a parameter format "3" indicates that the parameter is a character code, and a parameter length "01" indicates the length of a parameter which is given from an external equipment. Since the parameter is given from an external equipment, the default value is "0".

The manner of conversion table selection and conversion table addressing will be described hereinafter.

When, for example, the conversion table for the host equipment B is selected by operating a dip switch which can be externally operated, the reference address 2000 of the conversion table for the host equipment B is employed as a reference value for a conversion table processing routine. When a control code n given by the host equipment B is, for example, "12" designating paper feed operation, the reference address 2000 is added to the control code n to designate an address 2012. A parameter commanding the printer for paper feed operation stored at the address 2012 of the conversion table is read to control the paper feed operation of the printer.

Figure 5A:
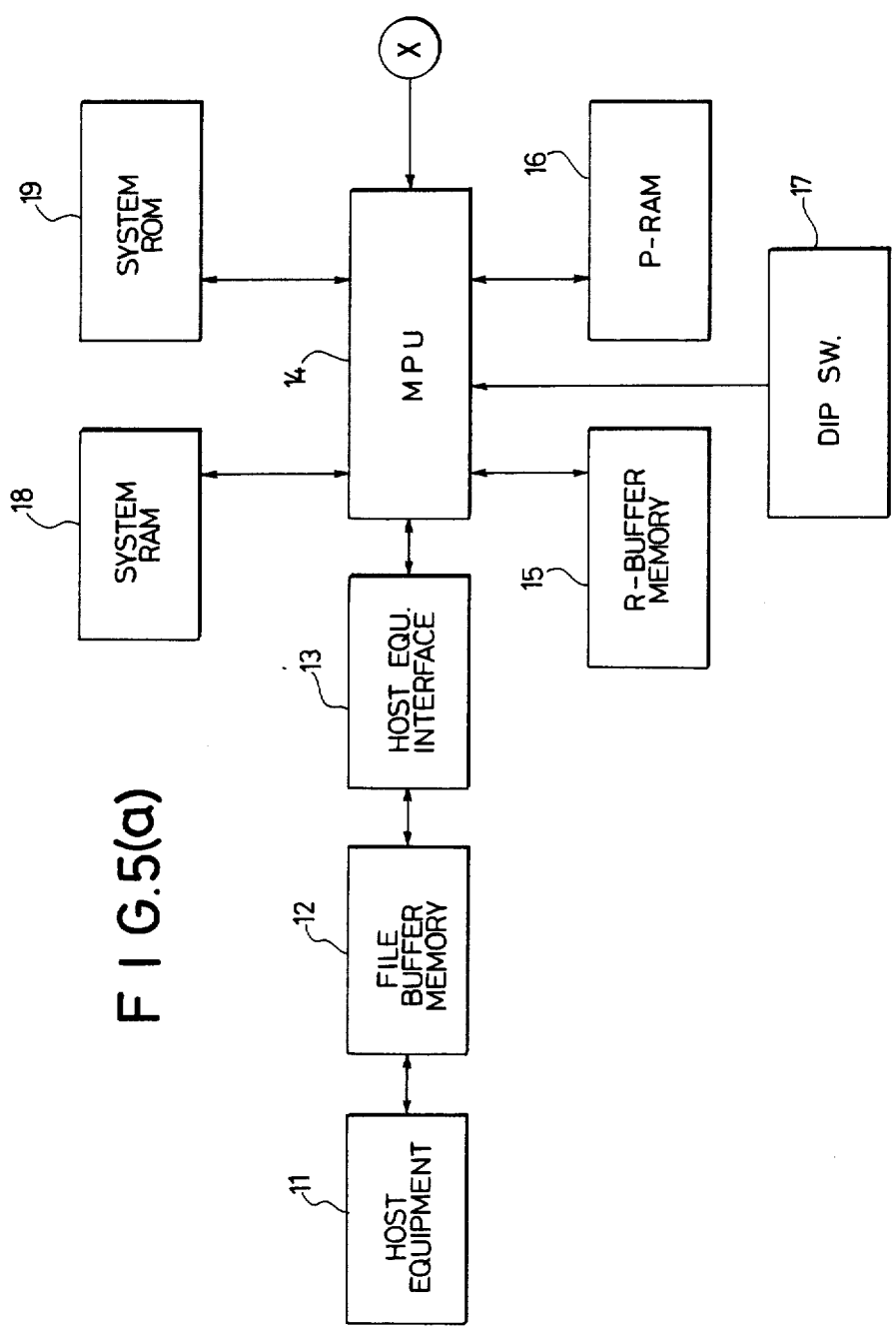
FIGS. 5a and 5b are a block diagram showing the circuit constitution of a printer controller, in a preferred embodiment, according to the present invention.
Figure 5B:
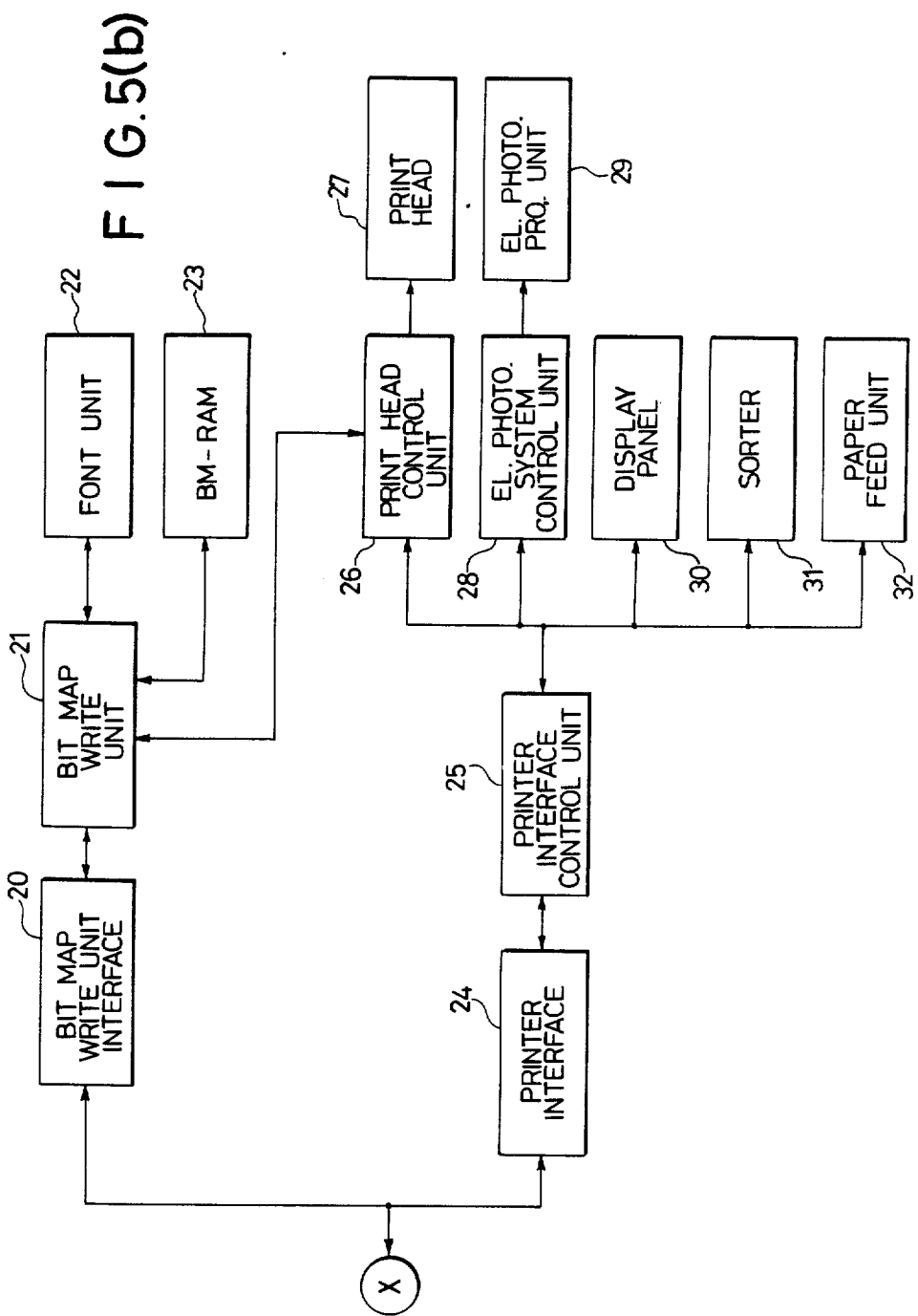

FIG. 5 shows the constitution of a printer controller of the present invention for controlling a printer of a bit map system. The printer of a bit map system prints characters and graphic forms in sets of dots. In the printer of a bit map system, characters and graphic forms to be printed in one page are edited in a bit map memory, the data representing the characters and graphic forms stored in the memory are given sequentially to the printer according to print commands, and the printing operation is completed at a moment when all the contents of the memory for one page are fed out.

Shown in FIG. 5 are an information processing equipment 11 to which a printer is connected, namely, a host equipment, a file buffer memory 12 for transmitting control data and character data delivered by the information processing equipment, an interface 13 interconnecting the information processing equipment and a controlling microprocessor (MPU) 14 for controlling the printer, a buffer memory 15 (hereinafter referred to as "R-buffer") for asynchronous communication with the information processing equipment, a P-RAM 16 for temporarily storing intermediate codes produced by converting the graphic data of characters and graphic forms by the controlling microprocessor 14, a dip switch 17 for designating the offset address of the address of a protocol conversion table corresponding to a host equipment, a system RAM 18 operated by the controlling microprocessor 14, a system ROM storing a control program and conversion tables, a bit map write unit interface 20, and a bit map write unit 21 connected through the bit map write unit interface 20 to the controlling microprocessor 14, which reads character image data from a font unit 22 storing character image data and edits graphic image data in a bit map 23 (hereinafter referred to as "BM-RAM") which edits and stores characters and graphic forms to be printed in pages, on the basis of the image data of characters and graphic forms given thereto by the controlling microprocessor 14.

Further shown in FIG. 5 are a printer interface 24, a printer interface control unit 25 comprising a microcomputer, which receives printer function control commands through the printer interface 24 from the controlling microprocessor 14 and controls the operation of the functional means of the printer including a print head control unit 26, an electrophotographic system control unit 28, a sorter 31 and a paper feed unit 32.

The print head control unit 26 controls a print head 27 to form the latent image of an image to be printed on a photosensitive drum. In this embodiment, the print head 27 is assumed to be a laser beam scanner. The print head control unit 26 reads print data through the bit map write unit 21 from the BM-RAM 23 according to a print start command given through the printer interface 24 to the printer interface control unit 25 by the controlling microprocessor 14 to control the print head 27. An electrophotographic processing unit 29 develops the latent image formed on the photosensitive drum and transfers the developed image on a recording medium.

A display panel 30 displays control information including set modes of the printer. The printer interface control unit 25 controls the sorter 32 for sorting operation, and the paper feed unit 32 for paper feeding operation.

The functions of the printer controller will be described hereinafter. The dip switch 17 is operated according to the host equipment to set the printer controller to receive information pertaining to the type of the host equipment. Upon the connection of the printer controller to a power source, the controlling microprocessor 14 fetches the control programs and the conversion table from the system ROM 19 and loads them to the system RAM and then executes a series of preparatory procedures including initialization and reading of font attributes.

Then, the printer controller receives data including character codes and control codes through the file buffer 12 and the interface 13 from the information processing equipment 11, i.e., the host equipment, stores the data temporarily in the R buffer 15 for reasons of processing efficiency, and analyzes and processes the received data. Thus, the character codes are processed to store character images to be printed in the P-RAM 16 for provisional edition through the bit map write unit interface 20 according to character image data stored in the font unit 12. The graphic data is processed through similar procedure.

After the received data has been analyzed, the control codes based on the protocol of the host equipment are converted directly into the corresponding control parameters for controlling the functions of the printer by using the conversion table. The control parameters which are not stored in the P-RAM 16 rate used for controlling the functional operation of the printer. The rest of the control codes are converted into intermediate codes, which are stored in the P-RAM 16.

For example, the received control code representing a print command is converted into the corresponding parameter, the parameter is stored temporarily in the P-RAM 16, a subroutine for the printing operation is fetched, and then the operation is executed in synchronism with the print data.

Commands for controlling the printing operation provided in the subroutine are given through the printer interface 24 to the printer interface control unit 25. Then, the printer interface control unit 25 controls the printer according to the received commands relating to printing operation. For example, when a print start command is given to the printer interface control unit 25, the printer interface control unit 25 actuates the print head control unit 26. Then, the print head control unit 26 reads the print data from the BM-RAM 23, and then drives the print head 27 so that electrostatic latent images corresponding to the print data are formed on the photosensitive drum. Subsequently, the printer interface control unit 25 actuates the electrophotographic system control unit 28 to drive the electrophotographic processing unit 29 for the execution of the electrophotographic processes for developing the electrophotographic latent images carried on the photosensitive drum, transferring the developed images on a recording medium, and fixing the images on the recording medium.

Control procedures to be executed by the printer controller embodying the present invention will be described hereinafter with reference to flow charts shown in FIGS. 6 to 11, on an assumption that the dip switch 17 has been operated according to the type of the host equipment 11 to be connected to the printer to make the controlling microprocessor 14 able to receive data relating to the type of the host equipment 11.

Figure 6A:
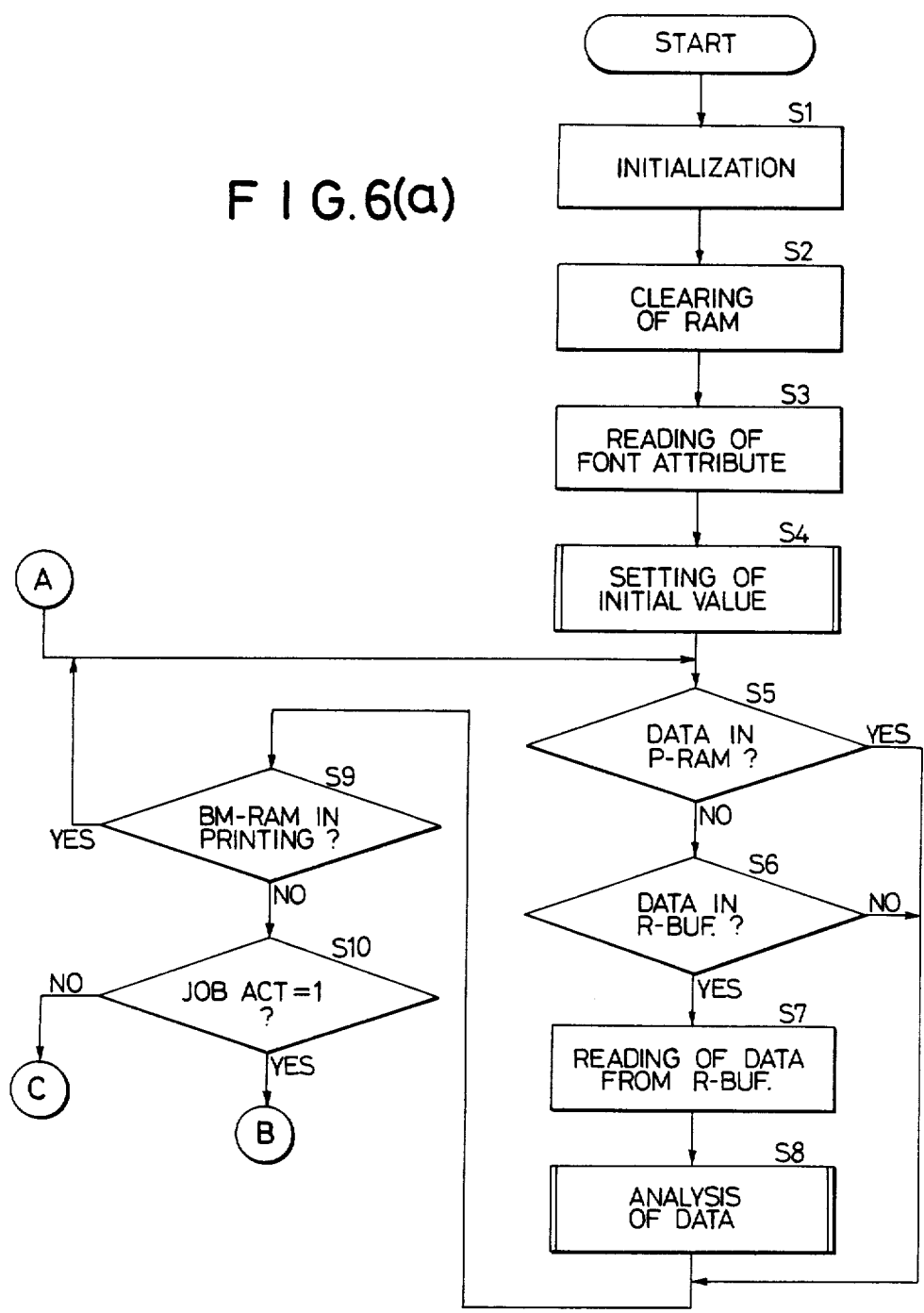
FIGS. 6a, 6b, 6c and 7 are flow charts of data processing procedures to be executed by the control microprocessor of the printer controller of FIG. 5.
Figure 6B:
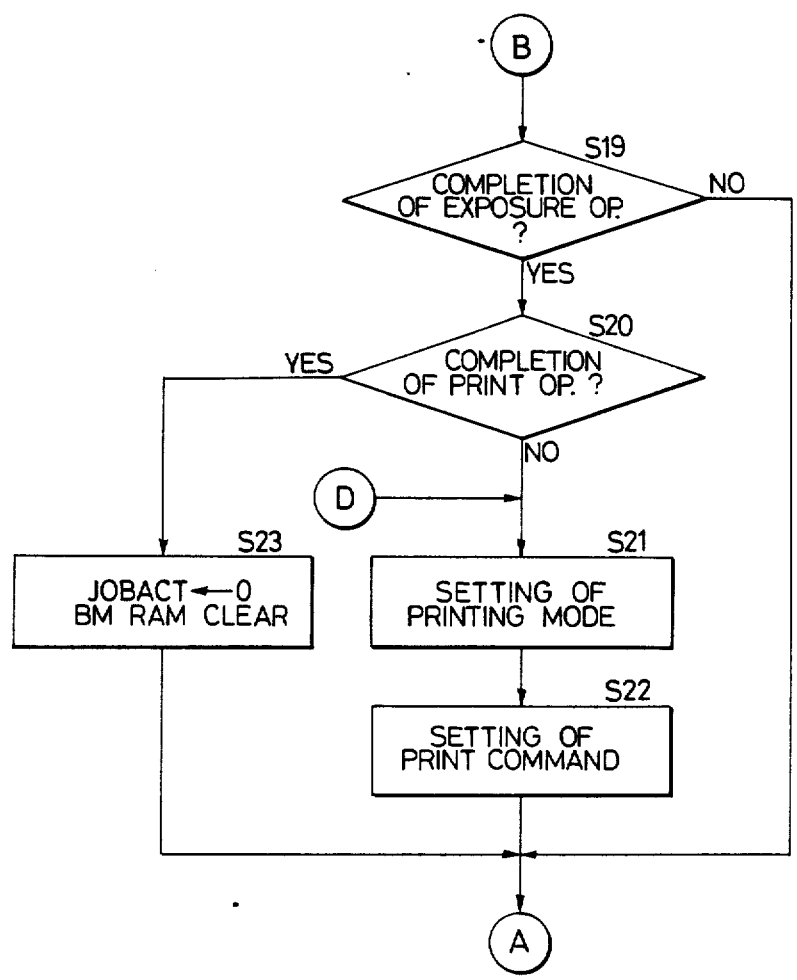
Figure 6C:
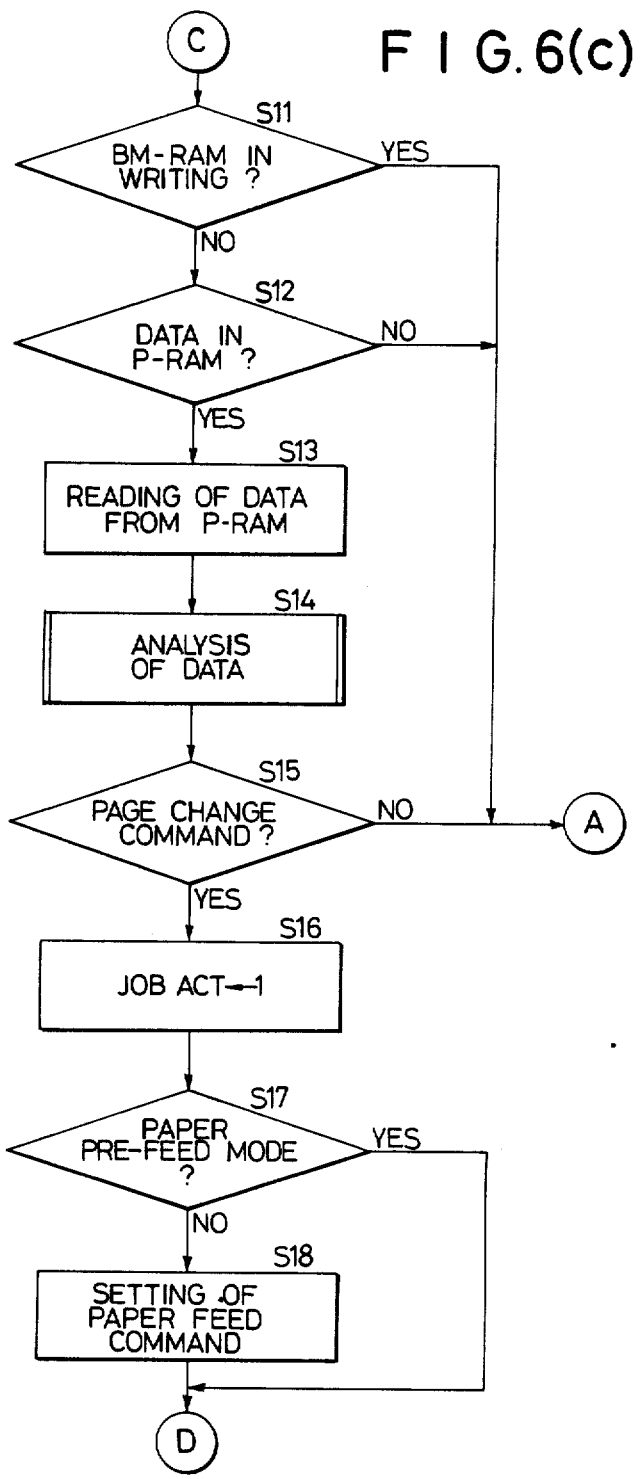

Referring to FIG. 6 generally showing the printer control procedures, upon the connection of the printer controller to the power source, the objective of control is initialized (step S1), and then the P-RAM 16 and the BM-RAM 23 are cleared (step S2). Then, the controlling microprocessor 14 reads the font attribute of the host equipment 11 from the font unit 22 (step S3). The controlling microprocessor 14 reads data relating to the host equipment 11 from the dip switch 17 and sets initial values necessary for correcting the address of the protocol conversion table, selecting a paper feed mode and selecting a paper feed cassette (step S4), which will be described hereinafter.

Then, a data processing operation for processing data received from the host equipment 11 is started. First, a decision is made whether or not any data is stored in the P-RAM 16 (step S5). When the decision in step S5 is "No", a decision is made whether or not any data is stored in the R-buffer 15 (step S6). When the decision in step S6 is "Yes", the data is read from the R-buffer 15 (step S7), and then the received data is analyzed (step S8). This procedure will be described hereinafter. When the decision in step S5 is "Yes" or when the decision in step S6 is "No", namely, when data is stored in the P-RAM 16 or when no data is stored in the R-buffer 15, the routine jumps to step S9.

A decision is made whether or not the data stored in the BM-RAM 23 is in the printing process (step S9). When the decision in step S9 is "Yes", the routine returns to step S5 and, when "No", reference is made to a flag JOBACT (step S10) to find whether or not the data for a plurality of pages is being printed. When JOBACT≠1, namely, when the data is not being printed, the routine goes to step S11.

In step S11, a decision is made whether or not data is being written in the BM-RAM 23. When the decision in step S11 is "No", a decision is made whether or not any data is stored in the P-RAM 16 (step S12) and, when "Yes", the data is read from the P-RAM 16 (step S13), and the read data is analyzed (step S14). The procedure will be described in detail hereinafter. When the decision in step S11 is "Yes" or when the decision in step S12 is "No", the routine returns to step S5.

Then, step S15 is executed to decide, from the results of analysis of the data read from the P-RAM 16, whether or not the control code is a page change command. When the decision in step S15 is "Yes", step S16 is executed to set the flag JOBACT for "1" and, when the decision in step S15 is "No", the routine returns to step S5.

In step S17, a decision is made whether or not a paper pre-feed mode is set. In the paper pre-feed mode, upon the reception of print data for the first page from the host equipment 11, the printer controller actuates the paper feed unit to feed a recording sheet to the printer. In a mode other than the paper pre-feed mode, a recording sheet is fed prior to starting the printing operation after the edition of print data for one page in the BM-RAM 23 has been completed. In a mode other than the paper pre-feed mode, a recording sheet is fed in response to a paper feed command (step S18). In the paper pre-feed mode, step S28 is skipped and S21 is executed to start the printing operation.

When the decision in step S10 is JOBACT=1, namely, when the printer is in the printing operation, a decision is made whether or not the exposure operation has been completed (step S19). When the decision at step S19 is "Yes", a decision is made whether or not a predetermined number of prints have been completed (step S20). When the decision in step S 20 is "No", the print mode is set in the print head control unit 26 to enable the printing operation, a print command is given to execute the printing operation (steps S21 and S22), and then the routine returns to step S5 for the next operation. When the decision in step S20 is "No", the routine goes to step S23, where the flag JOBACT is reset to "0", the BM-RAM 23 is cleared, and then the routine returns to step S5 for the next operation.

Figure 7:
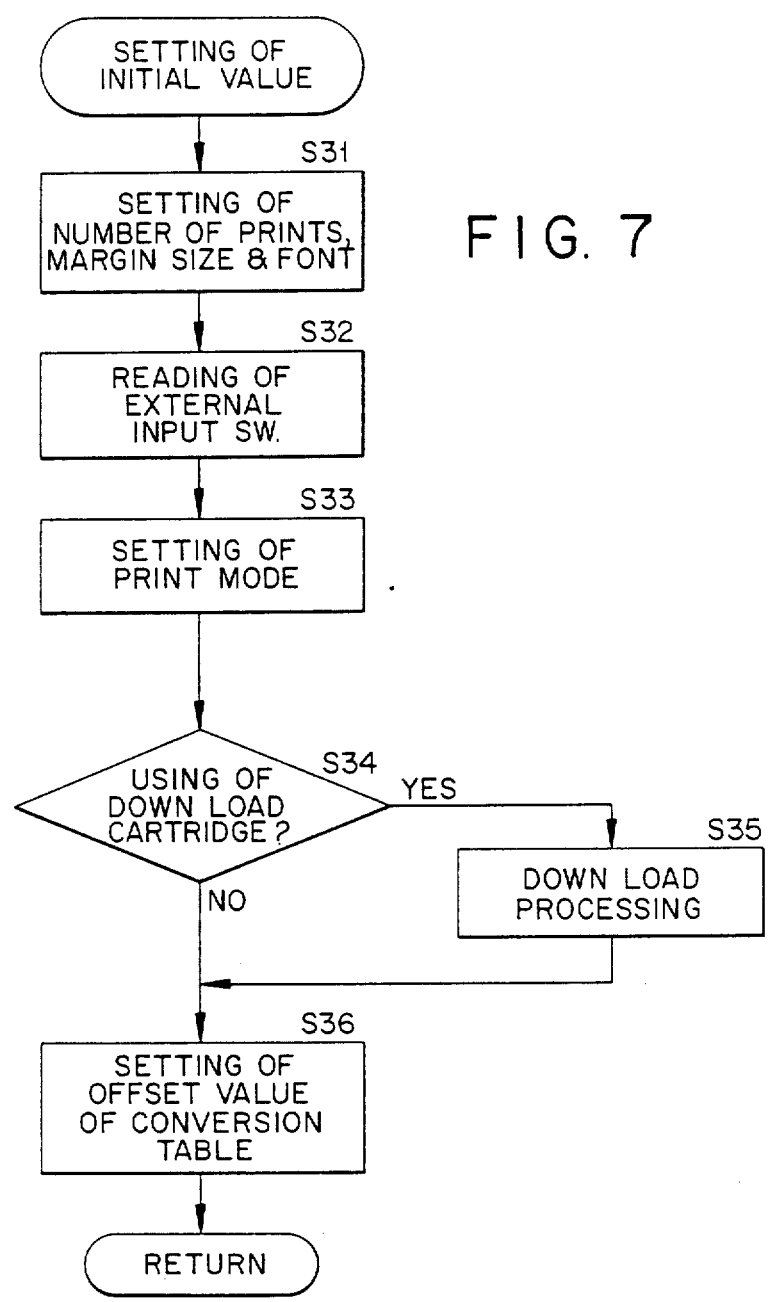

An initial value setting subroutine to be executed in step S4 of the flow chart shown in FIG. 6 will be described hereinafter with reference to a flow chart shown in FIG. 7.

Although initial values necessary for controlling the printer can be set according to control codes provided by the host equipment, basic controlled values must be set for a period before control codes are provided by the host equipment and for an occasion in which no control code is provided by the host equipment. Therefore, the number of prints to be produced, the margin size in the recording sheet, and the choice of a font cartridge are set in step S31. Then, data relating to the type of the host equipment selected by the dip switch 17 and data specified by means of external input switches are read (step S32) to set a print mode specifying printing conditions including the number of prints to be produced (step S33). In step S34, a decision is made whether or not a down load cartridge is used. When the decision in step S34 is "Yes", a down load procedure is executed (step S35). Then, an offset value for correcting the address of the protocol conversion table is set on the basis of data relating to the host equipment selected by means of the dip switch 17.

When a conversion table for a host equipmenmt having a special protocol is not prepared beforehand, an external switch is operated to select the down load processing. Then, an appropriate conversion table corresponding to the special protocol is fetched from a down load cartridge storing the conversion table, and then the conversion table corresponding to the special protocol is stored in the system RAM 18 of the microprocessor 14. For this purpose, the program may be designed so as to assign the initial address of the downloaded system RAM 18 as the offset value for the address of the conversion table.

Figure 8:
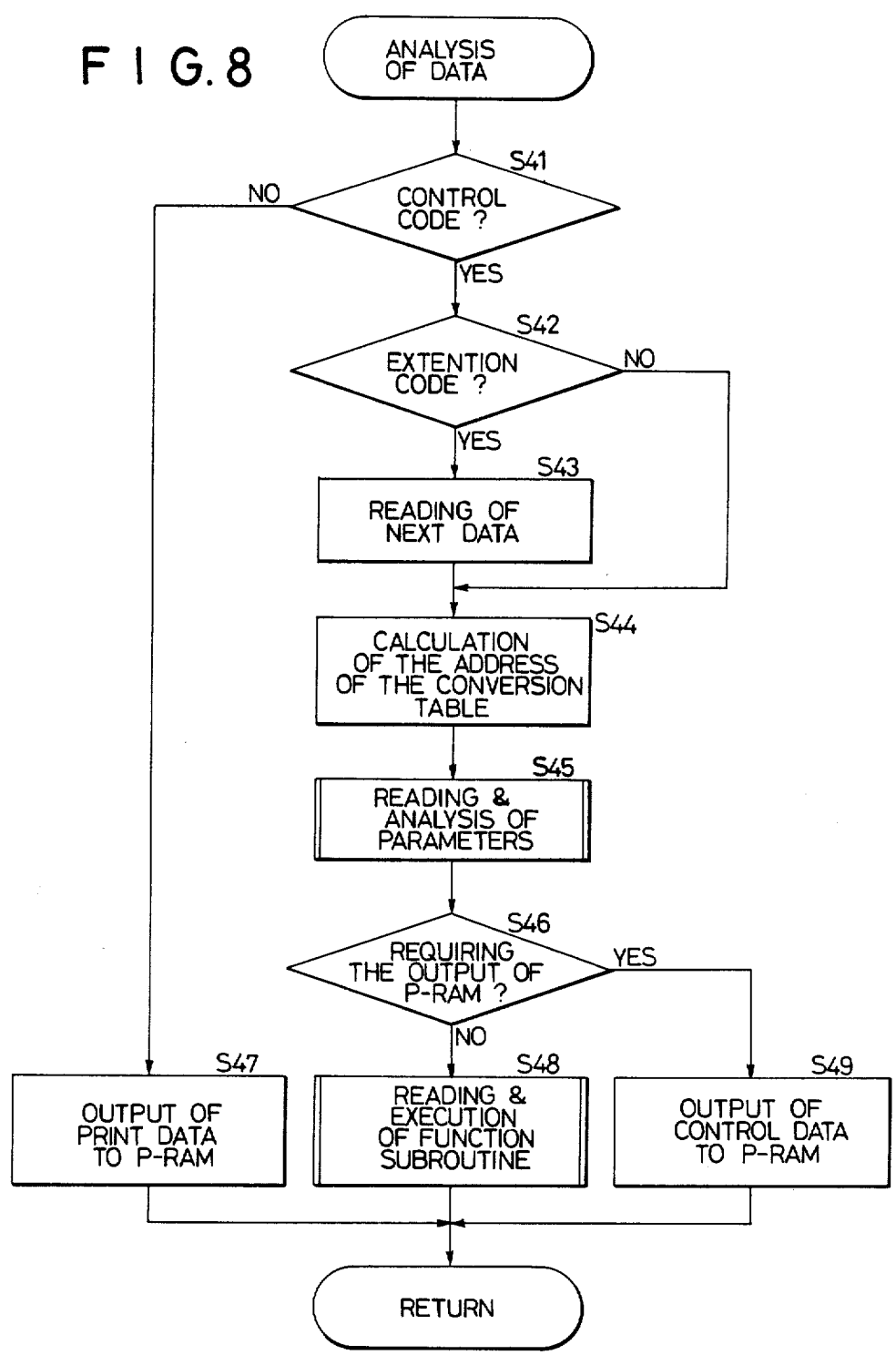

A subroutine for analyzing the received data to be executed in step S8 of the flow chart shown in FIG. 6 will be described hereinafter with reference to a flow chart shown in FIG. 8.

In step S41, a decision is made whether or not the received data is a control code. When the received data is not a control data, that is, when the recieved data is a character code, print data (including the address of a font corresponding to a character represented by the character data, an address in the BM-RAM 23 and a write mode) is output to the P-RAM 16 (step S47). When the received data is a control data, step S42 is executed to decide whether or not the control code is an extention code having control contents. When the decision in step S42 is "Yes", the next data is read (step S43) to obtain the details of the previously read control code. When the decision in step S42 is "No", step S43 is skipped.

Then, in step S44, the control code is multiplied by six bytes to determine the address of the conversion table. As mentioned with reference to FIGS. 2(a) and 2(b), each conversion table has six bytes. Therefore, the address of the conversion table is: $1 \times 6 = 6$ when the control code is "1", and is: $2 \times 6 = 12$ when the control code is "2". Then, an offset value for the type of the host equipment is added to the calculated address to determine the address of the conversion table; for example, an offset value "2000" for the host equipment B is added to "6" to obtain an address "2006" when the control code is "1", and to "12" to obtain an address "2012" when the control code is "2".

Then, the routine goes to step S45, where parameters including a function code corresponding to the control code, a parameter format and default values are read from the conversion table and the parameters are analyzed. This step will be described in detail hereinafter. Then, a decision is made whether or not a flag requiring the output of the P-RAM 16 (Refer to the function code shown in FIG. 2(b).) is set (step S46). When the decision in step S46 is "Yes", the parameters are output as control data to the P-RAM 16 in step S49. When the decision in step S46 is "No", the routine goes to step S48 to access and execute a subroutine for a specified function, for example, a paper feeding function, based on the parameter on the conversion table. This subroutine will be described in detail hereinafter.

Figure 9:
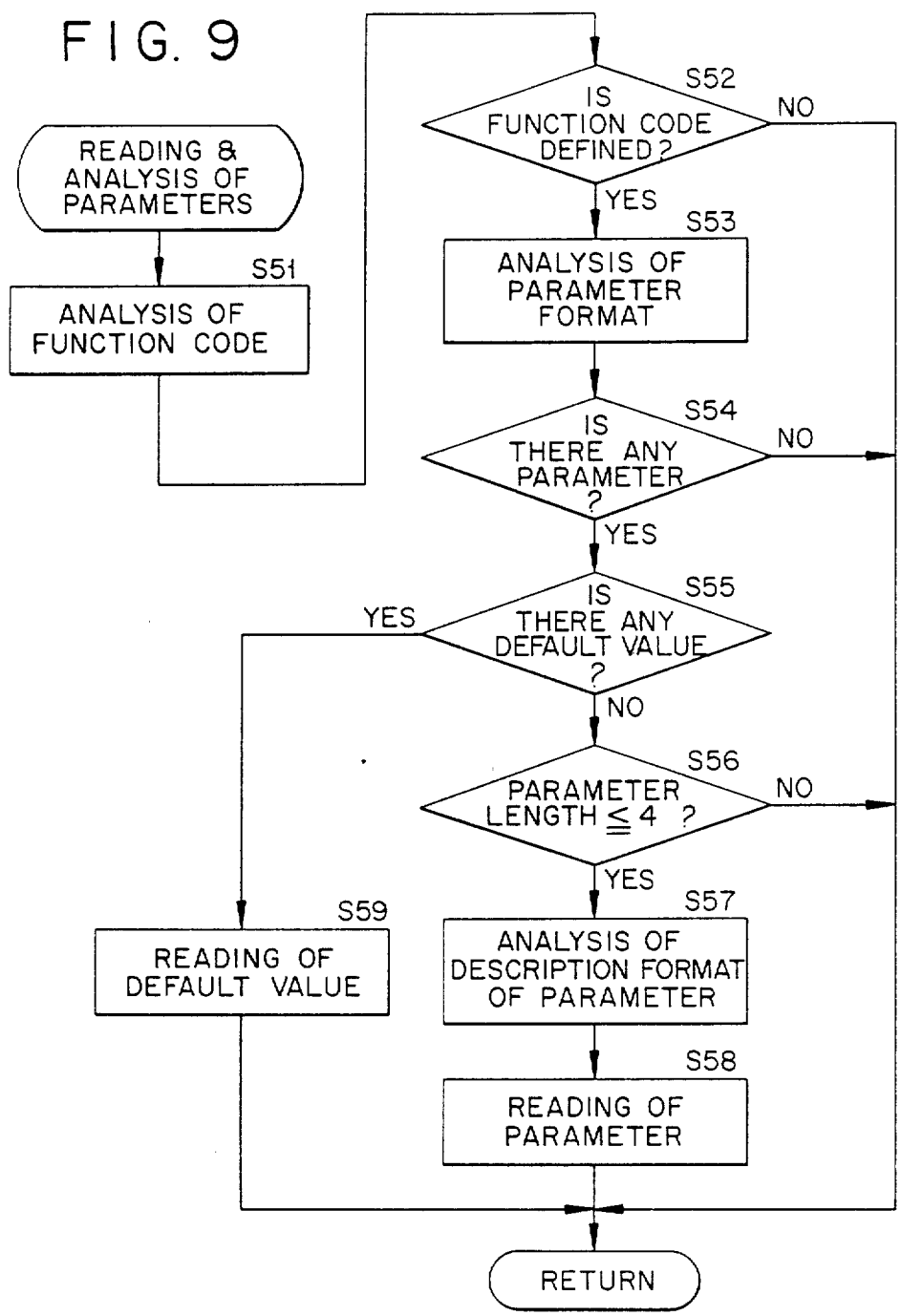

A subroutine for reading the parameters corresponding to the control code from the conversion table and analyzing the parameters to be executed in step S45 of the flow chart shown in FIG. 8 will be described hereinafter with reference to a flow chart shown in FIG. 9.

First, the function code among the parameters is analyzed (step S51). A decision is made whether the function code is a defined function code (step S52). When the decision in step S52 is "Yes", the function code is considered to correspond to the protocol, and then the parameter format is analyzed (step S53). A decision is made whether or not there is any parameter (step S54). When the decision in step S54 is "Yes", a decision is made whether or not there is any default value (step S55). When the decision in step S55 is "Yes", the default value is stored as a control data in a control register (step S59).

When the decision in step S55 is "No", the routine goes to step S56 to decide whether or not the parameter length is four bytes or less. When the decision in step S56 is "Yes", the description format of the parameter is analyzed (step S57) to find if the parameter format is of a decimal code, a hexadecimal code or a character code, and if the parameter source is an internal fixed value or an external control data. When the parameter source is an external control data, the control data is read through the R-buffer 15 and is stored in the control register (step S58).

When the decision in step S52 is "No", when the decision in step S54 is "No" or when the decision in step S46 is "No", the routine is ended.

Figure 10:
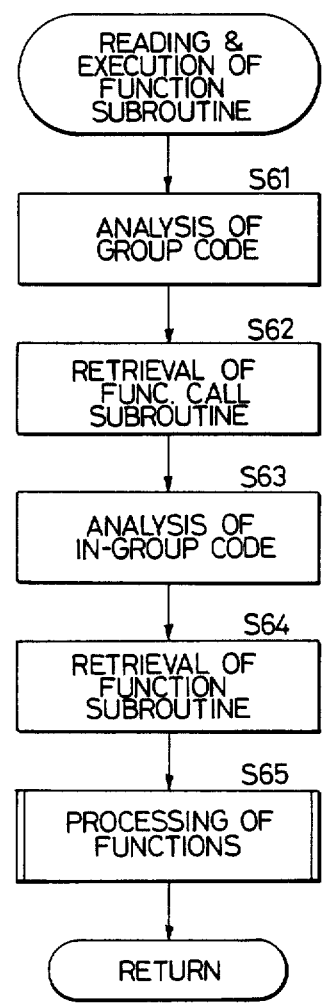

A subroutine to be executed in step S48 of the flow chart shown in FIG. 8 will be described hereinafter with reference to a flow chart shown in FIG. 10.

First, the group code among the function codes is analyzed (step S61). Then, a function call routine for each group is retrieved on the basis of the result of analysis of the group code (step S62). Further, a code within each group are analyzed (step 63), a function subroutine having a predetermined function is retrieved on the basis of the result of analysis in step S63 (step S64), and then the retrieved function subroutine is executed (step S65). Thus, predetermined functions, for example, paper feeding operation and printing operation, specified by the input control codes are executed.

Figure 11:
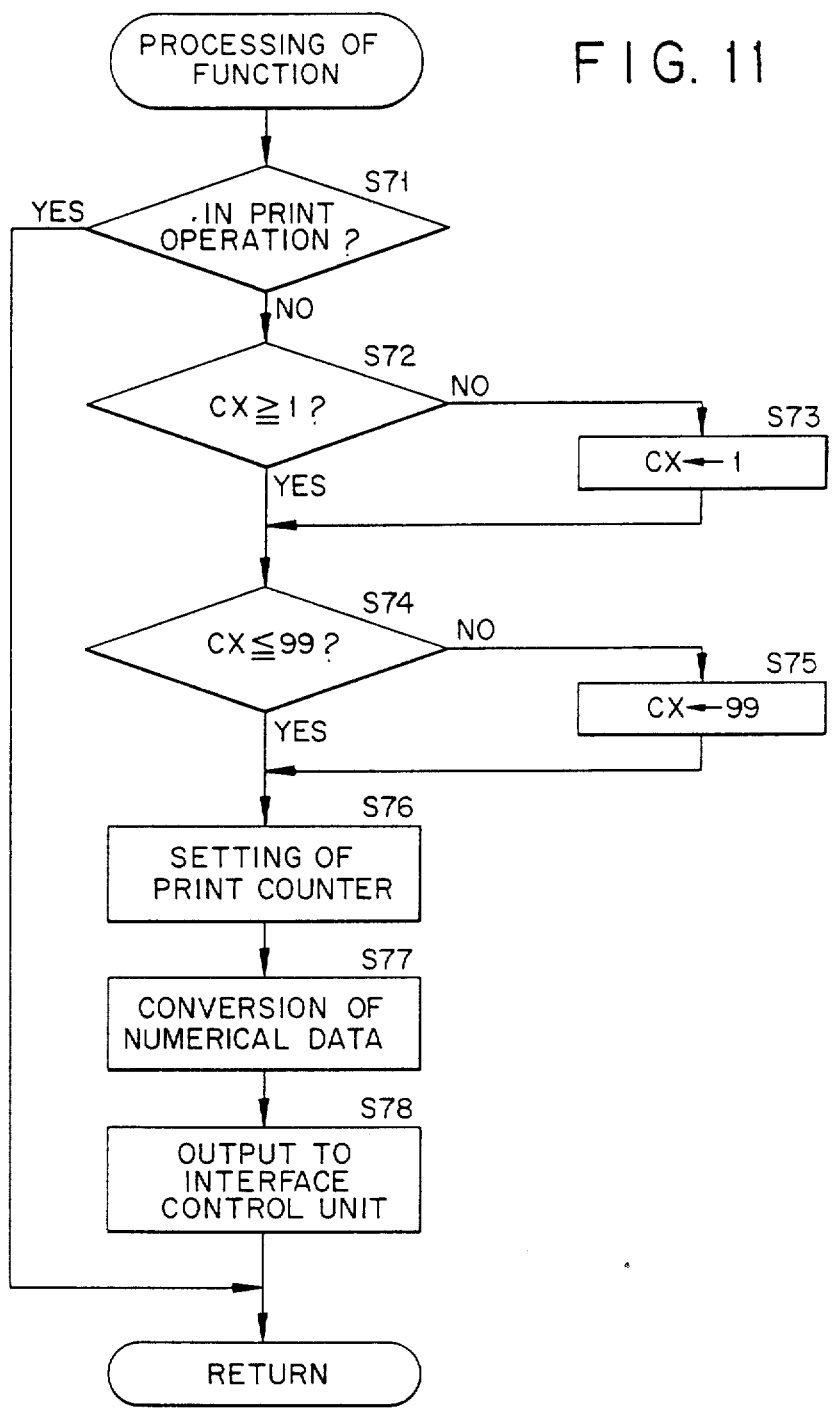

The subroutine to be executed in step S65 of the flow chart shown in FIG. 10 will be described in terms of a number of printing sheets designating subroutine, by way of example, will be described hereinafter with reference to a flow chart shown in FIG. 11.

A print flag is checked to decide whether or not the printer is in the printing operation (step S71). When the decision in step S71 is "Yes", the routine is ended. When the decision in Step S71 is "No", the routine goes to Step S72 to decide whether or not a set print number CX given as a parameter is "1" or greater. When the set print number CX is less than "1", the print counter is set for "1" (step S73). When the set print number CX is "1" or greater, a decision is made whether or not the set print number CX is "99" or less (step S74). When the decision in step S74 is "No", the print counter is set for "99" (step S75). When the decision in step S74 is "Yes", the print counter is set for a print number specified by the set print number CX (step S76). The set print number expressed by a hexadecimal number is converted into the corresponding binary-coded decimal number (step S77), the binary-coded decimal number is given to the interface control unit 25 (step S78) to display the print number, and then the routine is returned to the main routine.

Figure 12:
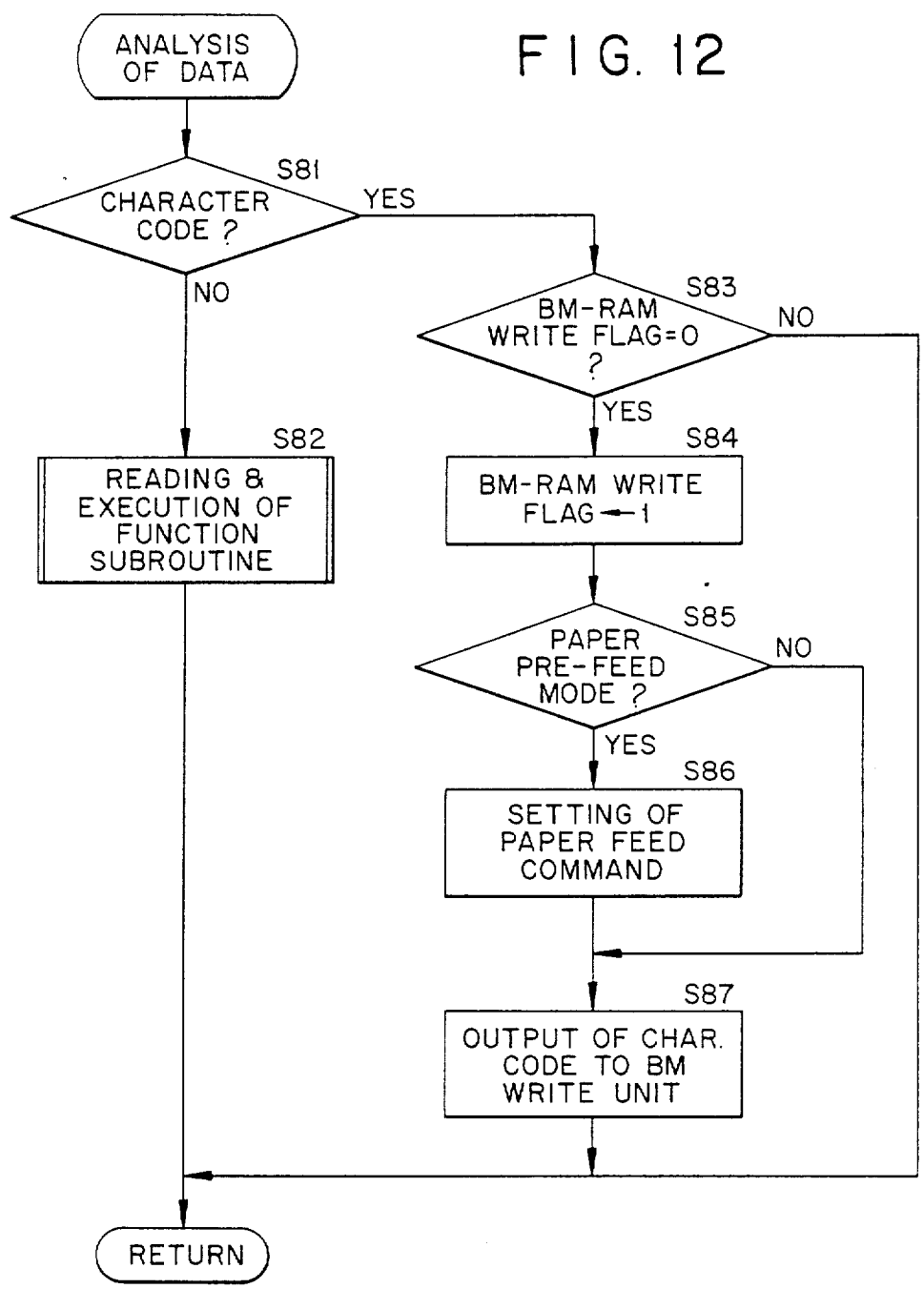

A subroutine for analyzing and processing the data from the P-RAM 16 in step S14 of the flow chart shown in FIG. 6 will be described hereinafter with reference to a flow chart shown in FIG. 12.

First, a decision is made whether or not the data read from the P-RAM 16 is a character code (step S81). When the decision in step S81 is "No", namely, when the data is a control code, the parameters are read from the P-RAM 16, the function subroutine is read, the function subroutine is executed (step S48 in FIG. 8), and then the routine is returned to the main routine.

When the decision in step S81 is "Yes", a BM write flag is checked (step S83) to decide whether or not any print data is stored in the BM-RAM 23. When the flag is "0", namely, when no print data is stored in the BM-RAM 23, the BM write flag is set for "1" (step S84) and, when the paper pre-feed mode is set (step S85), a paper feed command is provided (step S86). When the paper pre-feed mode is not set (step S85), step S86 is skipped and the routine goes to step S87 to output the character code to the bit map write unit to edit print data on a bit map. When the decision in step S83 is "No", namely, when print data is stored in the BM-RAM 23, the routine is returned to the main routine.

The control operation of the interface control unit of the printer will be described hereinafter with reference to a flow chart shown in FIG. 13.

Upon the supply of power, the interface control unit 25 starts operation. The internal memory and flags are initialized (step S101) and parameters are initialized (step S102). Then, when interruption signals are given to the interface control unit 25 by the controlling microprocessor 14, a subroutine for interruption is executed (step S103), which will be explained hereinafter. And then start signals are given to actuate the control units such as the paper feed unit 32 and the sorter 31 (step S104).

After foregoing preparatory procedures have been completed, the control operation is started. First, a print start flag is checked to decide whether or not the printer is in printing operation (step S105). When the print start flag is "0", namely, when the printer is not in printing operation, mode data representing the mode of operation of the printer such as the print number setting and operation of the sorter is read from the temporary storage of a memory, the mode data is updated (step S106), and a cancel flag is reset (step S107).

Upon the reception of a paper feed command from the controlling microprocessor 14, the printer interface control unit 25 checks a paper feed flag (step S108) to decide whether or not the paper feed flag is "1". When the decision in step S108 is "No", the routine returns to step S105. When the paper feed flag is set for "1", namely, when the paper feeding operation is started, the paper feed flag is reset (step S109) and a print start flag is set for "1" (step S110) to start the printing operation.

A decision is made whether or not a pre-feed enable flag which is dependent on the edit time of the preceding page is "1" (step S111). When the decision in step S111 is "Yes", namely, when paper pre-feed is enabled, a paper feed request signal is given to the electrophotographic control unit 28 (step S112). When the decision in step S111 is "No", step S112 is skipped.

In step S113, the paper pre-feed enable flag for the next page is set for "1" and a timer T is actuated for time counting.

In step S114, a decision is made whether the time count of timer T has completed. Completion of the time counting of the timer T before the print start flag, which is set in response to a print command provided by the controlling microprocessor 14, is set for "1" signifies that the print image edit time is exceeded. In such a case, the electrophotographic system control unit 28 provides a standby signal (step S115) to reset the paper pre-feed enable flag for the next page (step S116). When the time counting of timer T has not completed, a decision is made whether or not the print start flag is "1" (step S117). When the decision in step S117 is "No", the routine returns to step S114, where the routine is suspended until the print start flag is set for "1".

When the decision in step S117 is "Yes", the routine goes to step S118 to reset the print start flag, and then a decision is made whether or not the paper pre-feed enable flag is "0" (step S119). the decision in step S119 is "Yes", which signifies that no recording sheet is fed, a paper feed request signal is provided (step S120). When the decision in step S119 is "No", the routine goes to step S121.

In step S121, the paper pre-feed enable flag is renewed by paper pre-feed enable flag for the next page, the standby signal which has been applied to the electrophotographic system control unit 28 is cancelled (step S122), and then a decision is made whether or not the electrophotographic system control unit 28 is operative (step S123). When the decision in step S123 is "Yes", an exposure enable signal is given to the print head control unit 27 (step S124) to start the exposure operation. In step S125, a decision is made whether or not an exposure end flag is "1".

Upon the completion of the exposure operation, a decision is made whether a cancel flag is "1" (step S126). When the decision in step S126 is "Yes", namely, when the printing operation is cancelled, the count on a print counter i.e., a print number control parameter, is set for the initial set value "1" and the cancel flag is reset for "0" (step S127). When the decision in step S126 is "No", step S127 is skipped. Then, in step S128, "1" is subtracted from the set count of the print counter, and then a decision is made whether or not the count on the print counter is "0" (step S129). When the count on the print counter is reduced to "0" by the count-down operation during the normal printing operation, or by the reduction after the forced setting of the count on the print counter for "1" upon the detection of the cancel flag, the print counter is set temporarily for "1", the print start flag is reset, a job end flag is set for "1" (step S130), an exposure end signal is output (step S132), and then the routine returns to step S105 for the next cycle of the routine.

When the decision in step S129 is "No" signifying that the printing of the corresponding page has not yet been completed, the job end flag is rest for "0" in step S131, and then the routine goes to step S132.

The interrupt processing of the controlling microprocessor 14 into the control routine of the interface control unit 25 in step S103 shown in the flow chart of FIG. 13 will be described hereinafter with reference to a flow chart shown in FIG. 14.

In step S141, an interrupt command provided by the controlling microprocessor 14 is analyzed. When the interrupt command is a job start request, the print counter for counting the number of prints is set for "1" and the mode data is initialized (step S143).

When the interrupt command is a mode data update request requesting the updating of mode data of number of prints and the mode of the sorter, updated mode data is stored in a temporary memory. (The actual operation for this operation is carried out in step S106 of the flow chart shown in FIG. 13.)

The paper feed flag is set for "1", when the interrupt command is a paper feed request, the print start flag is set for "1" when the same is a print start request, the cancel flag is set for "1" when the same is a cancel request, and a pause flag is set for "1" when the same is a pause request, namely, a temporary stop request (steps S114 to S153). These flags set are used and are reset in the actual processes explained with reference to the flow chart shown in FIG. 13.

Figure 13B:
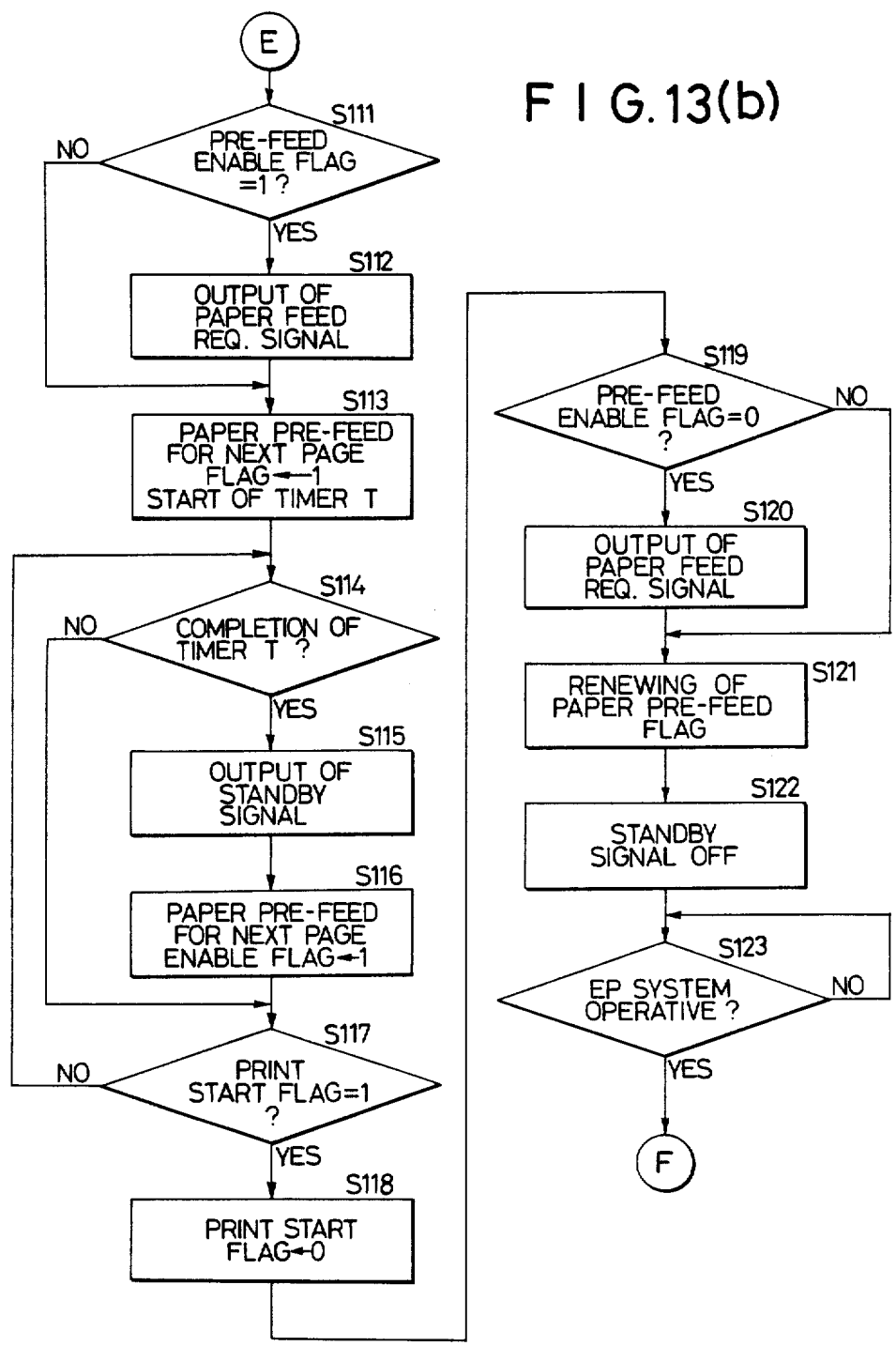
Figure 13C:
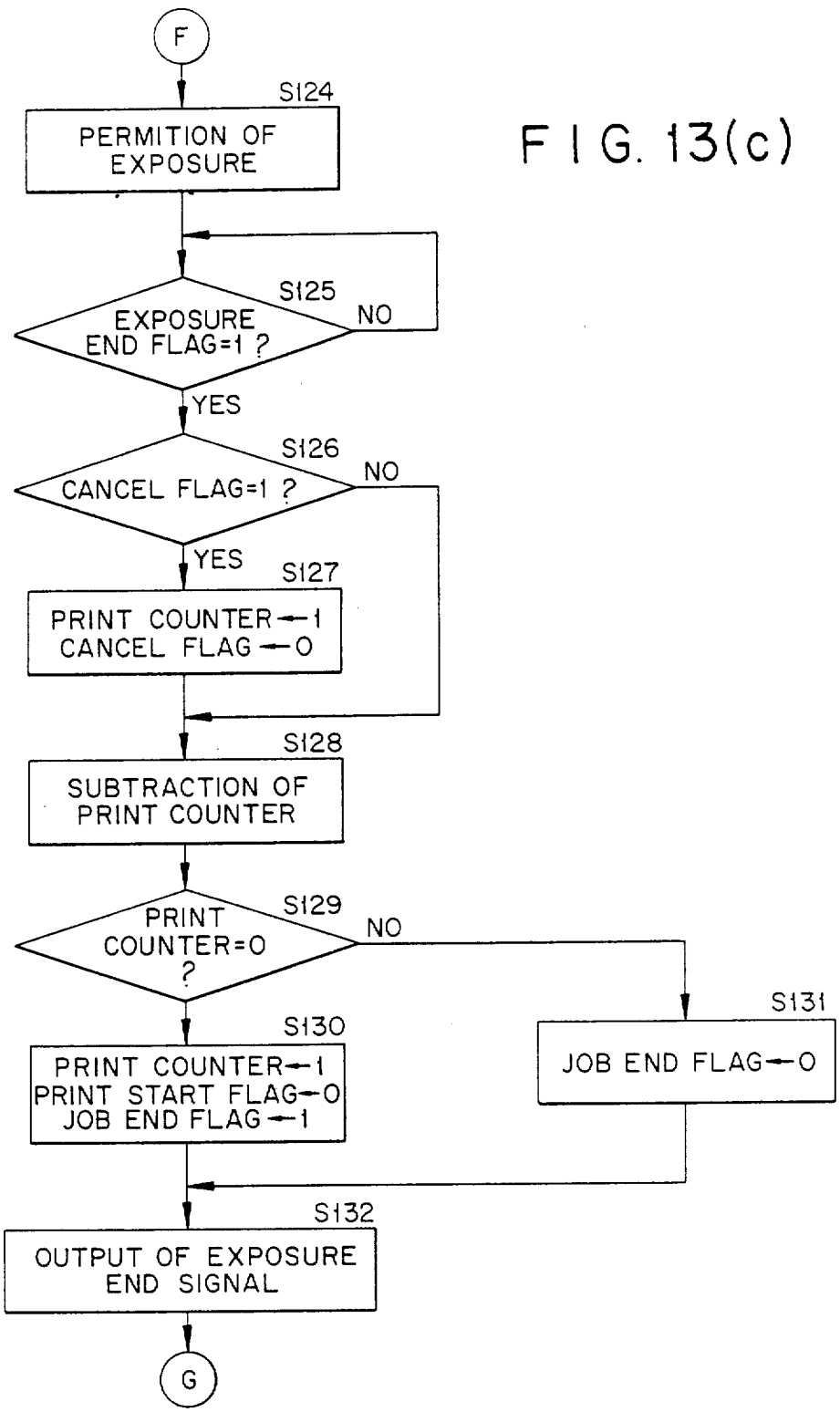

The pause flag is not used in the routine of the flow chart shown in FIG. 13, and is used in other routines. However, because the pause flag is not directly related with the present invention, the description thereof will be omitted.

As apparent from the foregoing description, the printer controller according to the present invention employs, to enable the connection of a printer to host equipments having a protocol different from that of the printer, conversion means capable of directly converting control data provided by a host equipment having a protocol different from that of the printer into printer function data for controlling the operation of the printer without converting the control data provided by the host equipment into control data based on the standard protocol of the printer. Accordingly, the conversion means is simple in constitution, and the printer function control means is able to control the functional means of the printer immediately in response to the reception of the printer function data.

Furthermore, when additional host equipments each having a protocol different from that of the printer are provided or when the printer is connected to a host equipment having a special protocol, the conversion means such as the conversion table is changed or a new conversion means is added to the program library, so that the printer controller is able to deal easily with the variation of the type of the host equipments.

Although the invention has been described in its preferred form with a certain degree of particularity, as many apparently different embodiments of this invention may be made without departing from the spirit and scope thereof, it is to be understood that the invention is not limited to the specific embodiment thereof except as defined in the appended claims.

What is claimed is:

1. A printer controller capable of connecting a printer having a protocol, to any one of a plurality of information processing equipments each having a protocol different from that of the printer, which comprises:

data receiving means which receives, from an information processing equipment to which the printer is connected, printer control data based on the specific protocol of the information processing equipment, and recording data representing an image to be printed;

conversion means which converts the control data received by said data receiving means into at least one printer control command corresponding to at least one function specified by the control data, said conversion means including a plurality of conversion tables corresponding to a plurality of information processing equipments each having a protocol different from that of the printer, selecting means for selecting one of the plurality of conversion tables corresponding to the information processing equipment connected to the printer, and a common conversion program for accessing said one of the plurality of conversion tables responsive to said selecting means and using said one of the plurality of conversion tables to convert the control data received by said data receiving means into said at least one control command; and control means which controls the printer responsive to said at least one converted printer control commands to obtain a print corresponding to the recording data.

2. A printer controller as claimed in claim 1, wherein said conversion means comprises a memory for storing each of said plurality of conversion tables at different address partitions, each table starting at an initial address and wherein said selecting means selects said one of said plurality of conversion tables by designating the initial address of the address partition of a conversion table to be selected.

3. A printer controller as claimed in claim 1, wherein said selecting means comprises a plurality of switches for allowing the selection of said one of the plurality of conversion tables.

4. A printer controller as claimed in claim 1, further comprising:
a memory for storing external input data;
down-loading means which down-loads one of said conversion tables into said memory; and
access means for causing said common conversion program to access the invention table down-loaded into said memory.

* * * * *